(12) United States Patent
Sylvia et al.

(10) Patent No.: US 9,453,705 B2
(45) Date of Patent: Sep. 27, 2016

(54) PAYLOAD LAUNCHER AND AUTONOMOUS UNDERWATER VEHICLE

(71) Applicant: LOCKHEED MARTIN CORPORATION, Bethesda, MD (US)

(72) Inventors: Russell M. Sylvia, South Dartmouth, MA (US); Martin C. Lewis, Plymouth, MA (US); Mark E. Whalen, Rochester, MA (US); Robert P. Gordon, Jr., North Attleboro, MA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 14/627,244

(22) Filed: Feb. 20, 2015

(65) Prior Publication Data

US 2016/0054097 A1 Feb. 25, 2016

Related U.S. Application Data

(60) Provisional application No. 61/942,893, filed on Feb. 21, 2014.

(51) Int. Cl.
| | |
|---|---|
| *F41F 3/042* | (2006.01) |
| *F41F 3/07* | (2006.01) |
| *B63G 8/00* | (2006.01) |
| *B63G 8/30* | (2006.01) |
| *B64C 39/02* | (2006.01) |
| *B64F 1/04* | (2006.01) |
| *F41B 11/72* | (2013.01) |
| *F41B 11/80* | (2013.01) |
| *F42B 14/06* | (2006.01) |
| *F42B 15/10* | (2006.01) |

(52) U.S. Cl.
CPC ............... *F41F 3/042* (2013.01); *B63G 8/001* (2013.01); *B63G 8/30* (2013.01); *B64C 39/024* (2013.01); *B64F 1/04* (2013.01); *F41B 11/72* (2013.01); *F41B 11/80* (2013.01); *F41F 3/07* (2013.01); *F42B 14/06* (2013.01); *F42B 15/105* (2013.01); *B63G 2008/004* (2013.01); *B64C 2201/08* (2013.01)

(58) Field of Classification Search
CPC ............ F41F 3/042; F42F 3/07; B63G 8/001
USPC .................................... 89/1.809, 1.81, 1.816
See application file for complete search history.

(56) References Cited

U.S. PATENT DOCUMENTS

| | | | | |
|---|---|---|---|---|
| 3,279,319 | A * | 10/1966 | Semonian | F41A 1/10 89/1.701 |
| 6,484,618 | B1 * | 11/2002 | Dubois | B63G 8/28 114/22 |

(Continued)

OTHER PUBLICATIONS

International search report for International application No. PCT/US2015/016778, dated Jun. 3, 2015 (3 pages).

(Continued)

*Primary Examiner* — Reginald Tillman, Jr.
(74) *Attorney, Agent, or Firm* — Hamre, Schumann, Mueller & Larson, P.C.

(57) ABSTRACT

A payload launch system is described that provides one launch solution suitable for multiple applications. A payload, such as a UAV, is launched from a sealed launch tube using compressed gas or other energy source. The launch tube can be used to transport and protect the payload from harsh environments for extended periods prior to launch.

11 Claims, 13 Drawing Sheets

(56) References Cited

U.S. PATENT DOCUMENTS

| | | | |
|---|---|---|---|
| 6,701,819 B1* | 3/2004 | Williams | F41F 3/07 |
| | | | 114/238 |
| 7,739,938 B2 | 6/2010 | Nair et al. | |
| 7,832,134 B2* | 11/2010 | Fu | F41C 9/06 |
| | | | 114/316 |
| 8,205,828 B2 | 6/2012 | Bossert et al. | |
| 8,205,829 B2 | 6/2012 | Bossert et al. | |
| 8,336,816 B2 | 12/2012 | Miller | |
| 8,439,301 B1 | 5/2013 | Lussier et al. | |
| 8,662,441 B2* | 3/2014 | Powell | B64C 39/024 |
| | | | 244/62 |
| 2011/0073707 A1 | 3/2011 | Bossert et al. | |
| 2012/0001020 A1* | 1/2012 | Miralles | B64C 39/024 |
| | | | 244/63 |
| 2012/0043411 A1 | 2/2012 | Beck et al. | |
| 2012/0205488 A1 | 8/2012 | Powell et al. | |
| 2015/0008280 A1* | 1/2015 | Smoker | B63G 8/001 |
| | | | 244/63 |

OTHER PUBLICATIONS

Written opinion for International application No. PCT/US2015/016778, dated Jun. 3, 2015 (6 pages).

* cited by examiner

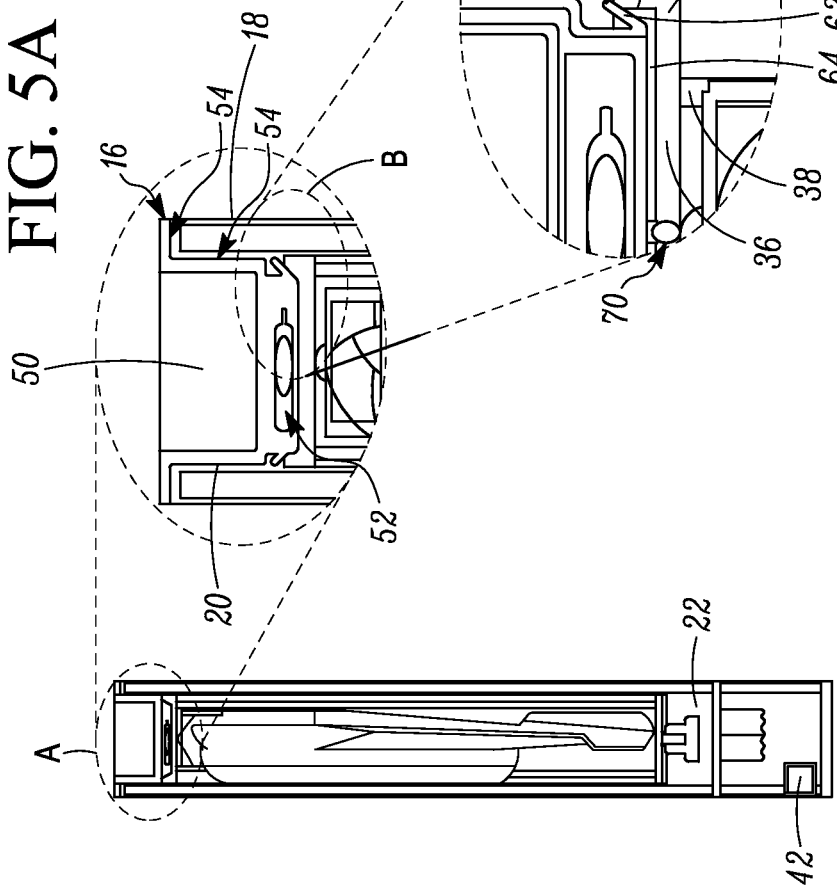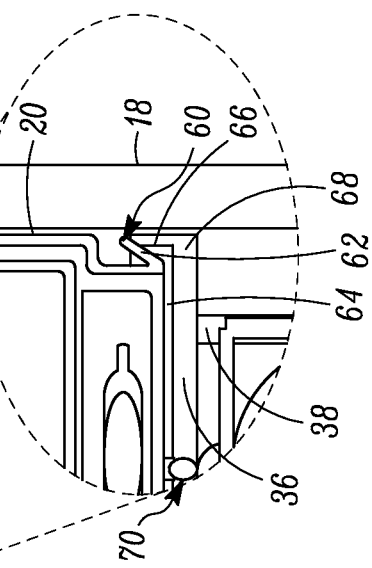

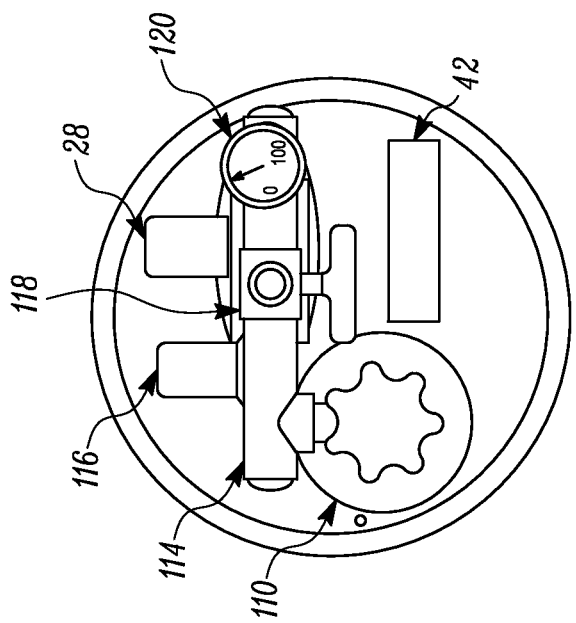
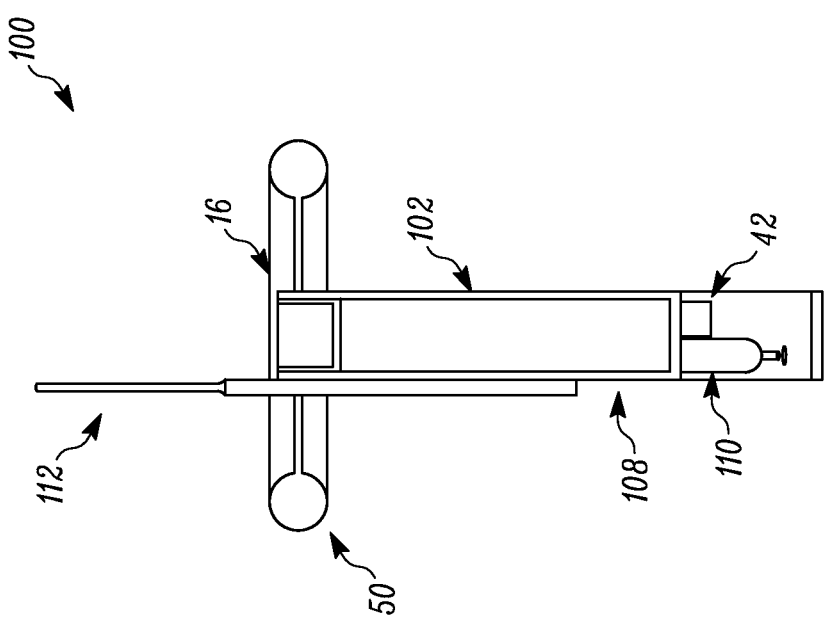
FIG. 7
FIG. 6

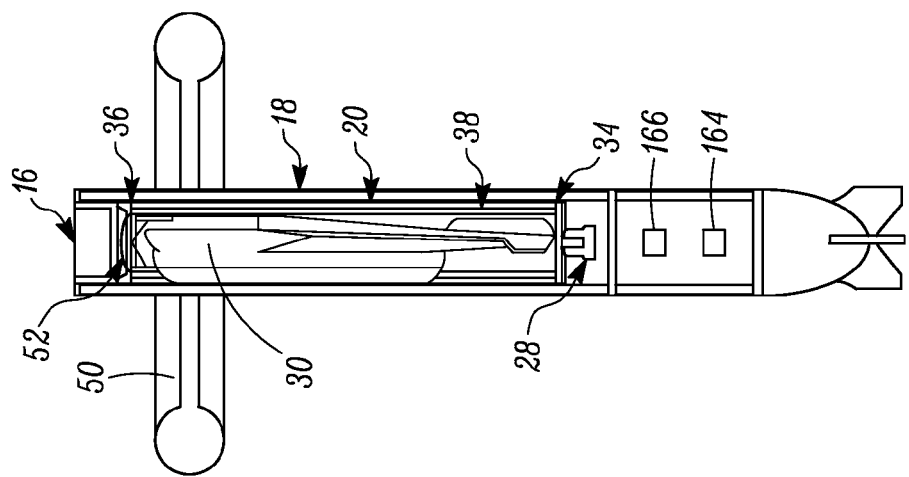
FIG. 12
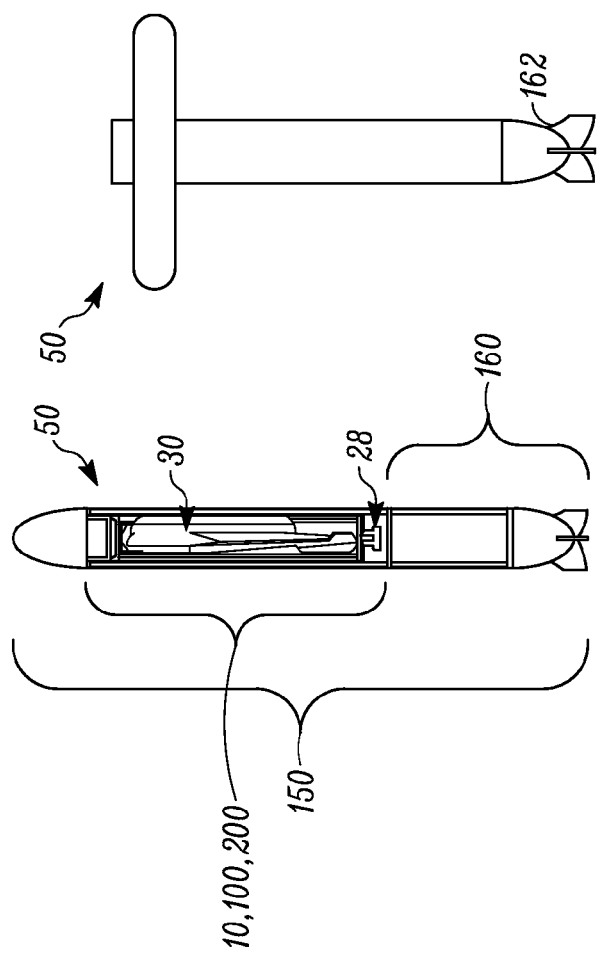
FIG. 11
FIG. 10

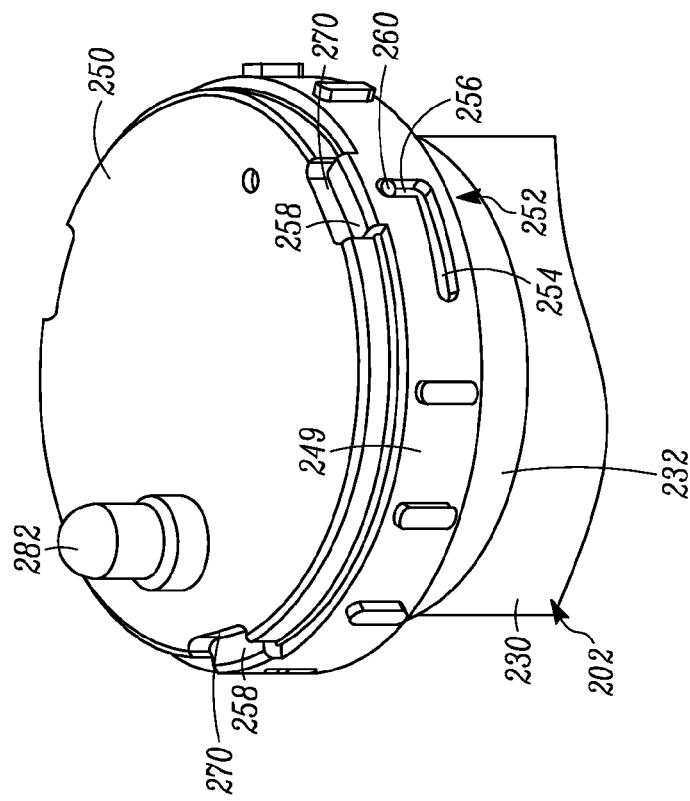
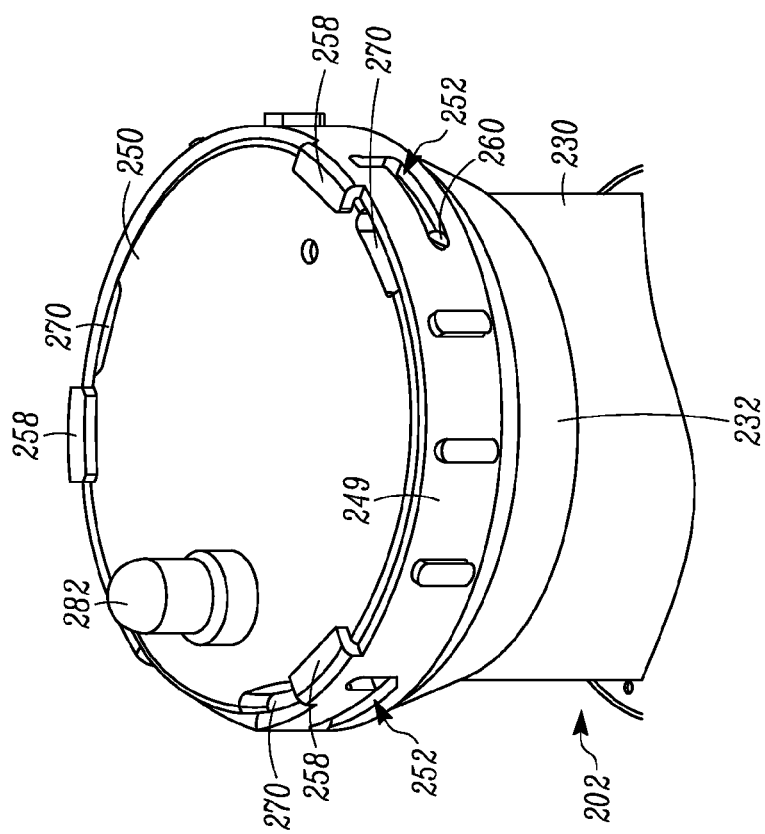
FIG. 16B
FIG. 16A

PAYLOAD LAUNCHER AND AUTONOMOUS UNDERWATER VEHICLE

FIELD

This disclosure relates to launching payloads including, but not limited to, unmanned aerial vehicles (UAV), and to an underwater vehicle, such as an autonomous underwater vehicle (AUV), that can launch the payload.

BACKGROUND

UAVs continue to increase in capability and applications. Transporting and launching small, fragile UAVs can be tedious and time consuming to setup and launch in certain environments. Transport, setup and launch can be extremely challenging in remote covert locations or from a moving platform.

UAVs need to be transported without damaging their fragile structures and time is needed to prepare for flight and launch. Launching UAVs becomes difficult when launching from remote covert locations in harsh environments. Also, UAV's and existing rail type launch systems are not designed to handle prolonged prelaunch exposure in harsh environments. Launching a UAV from a covert underwater platform, moving or not moving, is one example of a harsh environment.

Mobile land vehicles operating in the harsh environments do not currently carry rapid, ready to launch UAV systems or utilize them as a forward scout that are instantly deployed from inside their vehicles. This becomes a particular problem in urban environment where snipers or RPGs await an ambush on roof tops.

Autonomous boats patrolling the perimeter of an anchored ship currently have no method to put a UAV in the air to extend an aerial eye beyond the perimeter and on inbound traffic.

Currently UAVs are launched from moving and fixed platforms. Small UAVs can be launched by hand. The launchers used for moving and fixed platforms are mostly rail type catapults that take time to setup, while the rail and UAV are fully exposed to the environment. Hand launching needs a man to physically throw the small UAV into the air, which might not be an option under fire or in a rapidly moving vehicle. There are some specialty launchers specifically designed to launch UAVs from underwater but they cannot be used universally for any other application.

In addition, as demand for remote autonomous operations increases, it becomes difficult and expensive to deliver UAVs to a final covert launch position. The endurance of small UAVs is limited by the battery supply they can carry. Further, current launch techniques of UAVs is typically either a manned operation or requires set-up of a rail type launch system. In the case of manned UAV launch, operators position themselves at the final launch point and release the UAV. This creates a situation of putting humans in harm's way and potentially losing the advantage of surprise.

SUMMARY

A payload launch system is described that provides one launch solution suitable for multiple applications. In the described examples, a payload is launched from a sealed launch tube using an energy source including, but not limited to, compressed gas, a spring, or the like and combinations thereof. The launch tube can be used to transport and protect the payload from harsh environments for extended periods prior to launch.

The payload can be any unmanned payload that one may wish to transport and launch, and protect the payload from harsh environments for extended periods of time prior to launch. In one non-limiting embodiment, the payload is a UAV.

As used herein, a UAV can be any unmanned aerial vehicle designed to fly or float in the air. In one specific embodiment, the UAV can be a folding version sized to fit within the launch tube, with spring loaded, foldable airfoils and a battery powered propulsion system such as a propeller.

In addition, an underwater vehicle is described that integrates the payload launch system therein to permit subsurface launching of the payload. The underwater vehicle can be any underwater vehicle, manned or unmanned, designed to operate underwater and that can carry and launch the payload launch system.

In one embodiment, the underwater vehicle can be an AUV, manned or unmanned.

The term "unmanned" used herein means the payload, such as the UAV and in some embodiments the AUV, do not physically carry a human operator. In some embodiments, the payload and the AUV can be completely autonomous so that their operation is preprogrammed with no remote human control or operational intervention. In another embodiment, the payload and the AUV are semi-autonomous so that some or all of their operation is controlled remotely by one or more human operators. In some embodiments, the AUV or other underwater vehicle carries one or more human operators that control some or all of their operation.

Both the payload and the underwater vehicle can send data, such as sensor data, video, camera images, and the like, to a remote location for analysis or forwarding to another location.

In one embodiment, the payload can be a small folding version of a UAV with spring loaded, folding airfoils disposed, along with a sabot, in the fully sealed launch tube. Prior to launch, the launch tube can be pressurized with compressed gas to launch the sabot and the UAV from the launcher. The compressed gas can be any suitable compressible gas including, but not limited to, air, argon, nitrogen, helium, or the like. In another embodiment, an energy source other than or in addition to compressed gas can be used to affect launch, such as a spring.

In one embodiment, the payload launch system comprises a pre-packaged payload and a sabot loaded into a launch tube. A sealed, auto-release cap is fitted at an end of the launch tube sealing it from harsh environments and prevent ingress of water into the launch tube prior to launch. The system is charged with compressed gas and ready to launch locally or from a remote location. The payload launch system can be physically placed where needed for prolonged exposure.

The described payload launch system can be used in the following exemplary applications including but not limited to:

Fixed land station—Manned or unmanned remote base.
Moving land vehicle—Externally mounted to transports, tanks etc.
Fixed moored surface buoy in rivers, bays and oceans—Deployed remotely to monitor shipping and local traffic.
Fixed underwater moored buoy in rivers, bays and oceans—Covert deployments of unmanned platforms.

Moving surface water platforms, boats and ships—Manned and unmanned platforms.

Moving underwater platforms—Manned and unmanned platforms.

In an embodiment, the payload launch system can be towed underwater by a manner or unmanned underwater vehicle, such as an AUV. The payload launch system can be positioned on the vehicle at any location that permits either release of the payload launch system for launching of the payload or permits launch of the payload while attached to the vehicle. Example positions include on top of the vehicle, below the vehicle, or stowed in or within the vehicle. The payload launch system could also be stowed in the water on any underwater fixed platform.

DRAWINGS

FIG. 5 is a detailed cross-sectional side view of the payload launch system.

FIG. 5A is a detailed view of the portion A in FIG. 5.

FIG. 5B is a detailed view of the portion B in FIG. 5A.

FIG. 6 is a cross-sectional side view of another embodiment of a payload launch system.

FIG. 7 is an end view of the payload launch system of FIG. 6 with the service cap removed.

FIG. 10 is partial cross-sectional side view of an AUV incorporating the payload launch system.

FIG. 11 is a side view similar of the AUV with the lift bag deployed.

FIG. 12 is a detailed, partial cross-sectional side view of the AUV of FIG. 10.

FIGS. 16A and 16B are perspective views of the upper end of the launch system of FIGS. 13-15 prior to launch, with the upper end of the launch tube including a manually actuated safety ring, with the safety ring in a locked position and an unlocked position, respectively.

DETAILED DESCRIPTION

A payload launch system is described that provides one launch solution suitable for multiple applications. In the described launch system, a payload is launched from a sealed launch tube using a suitable energy source, such as compressed gas. Other energy sources, such as a spring, could also be used in place of or in addition to the compressed gas.

The payload can be any unmanned payload that one may wish to transport and launch, and protect the payload from harsh environments for extended periods of time prior to launch. To simplify the description, the payload will hereinafter be described as a UAV that is designed to be launched into the air and once launched, fly under its own power performing a desired mission. However, it is to be realized that the payload is not limited to a UAV, and can include, but is not limited to, other payloads such as a balloon with a sensor package, munitions and many others.

In one embodiment, the payload launch system can be used on land to launch the UAV from land, while the launch system is stationary or moving. In another embodiment, the payload launch system can be used on or in water to launch the UAV from the water, while the launch system is stationary or moving.

Figure 2:
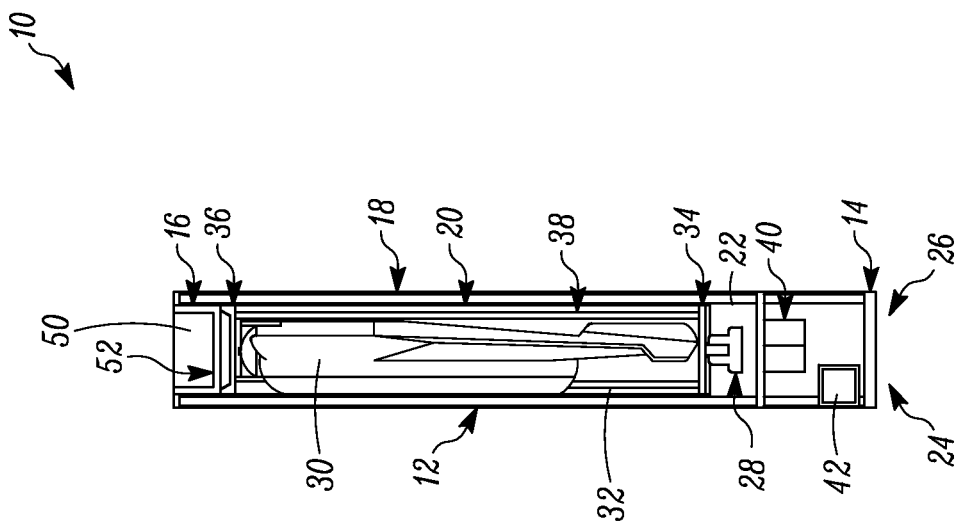
FIG. 2 is a cross-sectional side view of the payload launch system of FIG. 1.
Figure 1:
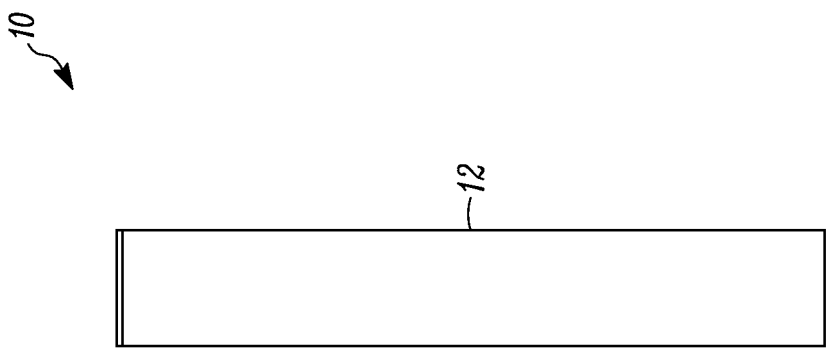
FIG. 1 is a side view of a payload launch system described herein prior to launch.

With reference to FIGS. 1 and 2, one embodiment of a payload launch system 10 is illustrated. The launch system 10 is shown in a stowed, ready to launch configuration. The launch system 10 includes a sealed launch tube 12 that is sealed at its bottom end by a service cap 14 and sealed at its top end by a releasable cap 16 that seals the top end of the tube 12 to prevent ingress of water into the tube 12. The tube 12 can be made from any material, for example steel, aluminum, or plastic, suitable for withstanding launch pressure and the environments within which the launch system 10 is used.

In the illustrated example, the tube 12 includes an outer pressure hull 18 and an inner pressure hull 20 spaced inwardly from the outer pressure hull 18. The interior space of the tube 12 between the outer hull 18 and the inner hull 20 forms a chamber 22 for holding compressed gas. In this example, the compressed gas can be introduced into the chamber 22 via a filler port 24 in the service cap 14. The service cap 14 can also include an electronics connection 26, for example an Ethernet port, permitting I/O connections to electronics within the launch system 10.

An electronically operable dump valve 28 is provided in the inner pressure hull 20. The dump valve 28 releases the compressed gas from the compressed gas chamber 22 to the base of the launch tube to cause launch of the payload.

Within the inner pressure hull 20 is a UAV 30. In the illustrated example, the UAV 30 has spring loaded, foldable airfoils and a battery powered propulsion system such as a propeller, small enough to permit the UAV to fit within the launch tube 12. UAV's with foldable airfoils that are small enough to fit within the launch tube are known in the art.

The UAV 30 is fitted within a sabot 32. The sabot 32 protects the UAV 30 during storage and launch, and falls away when the UAV is launched and its airfoils extend to take flight. The construction and function of sabots to protect payloads during launch is well known in the art.

The sabot 32 includes a base 34, a top plate 36, and push rods 38 that extend from the base 34 to the top plate 36.

Further information on the sabot 32 is discussed below with respect to FIGS. 5, 5A and 5B.

FIG. 2 also shows the launch system 10 as including one or more batteries 40. The batteries 40 provide power for powering various components on the launch system 10 such as the dump valve 28, a controller electronics assembly 42 that can include a tilt sensor, and other elements discussed below.

In some embodiments, it may be desirable to pressurize the service section of the launch tube 12 where the battery 40 and the control electronics 42 reside to increase the compressed volume reservoir or decrease the overall size of the launch tube. In such an embodiment, the battery 40 and control electronics 42 would need to be configured to handle the pressure or be removed.

The launch system 10 described so far is suitable for launching the UAV 30 from land or from a stable platform such as a vehicle, surface ship, or other platform, with the system 10 illustrated in FIGS. 1 and 2 shown in a stowed, ready to launch configuration.

For a water launch, the launch system 10 can also include a stowed, deployable lift bag 50 arranged in the cap 16 as depicted in FIG. 2. One or more compressed gas cartridges 52, for example $CO_2$ cartridges, can be provided to deploy and inflate the lift bag 50. The construction and operation of lift bags to cause objects to float in water are well known in the art.

Figure 4:
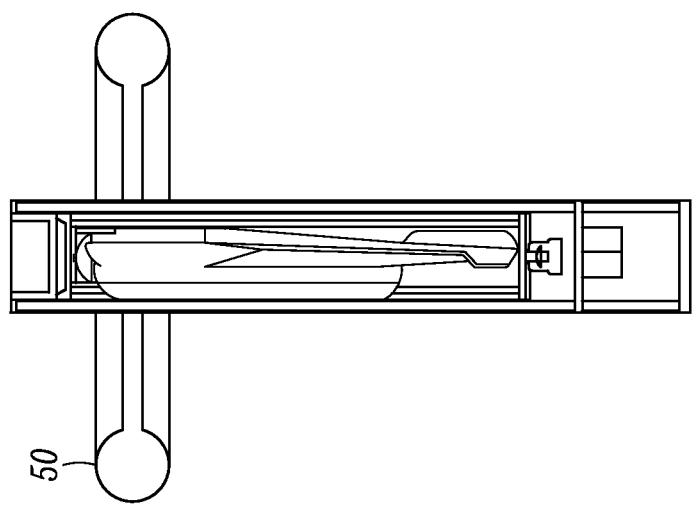
FIG. 4 is a cross-sectional side view of the payload launch system of FIG. 3.
Figure 3:
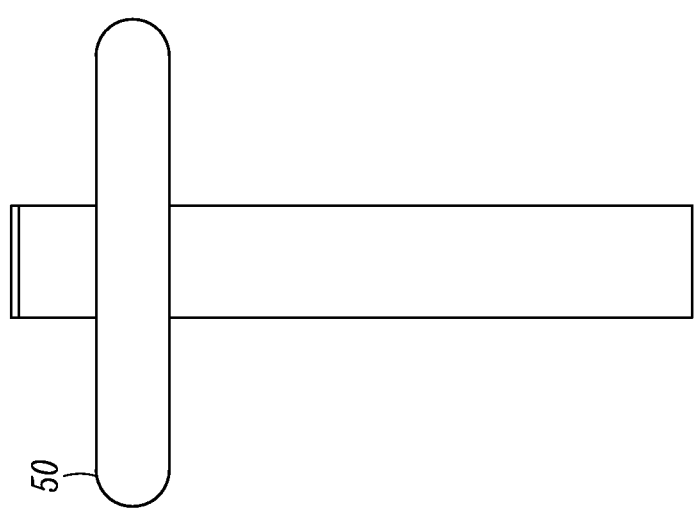
FIG. 3 is a side view similar to FIG. 1 but with an optional lift bag deployed for use in a water launch.
Figure 8:
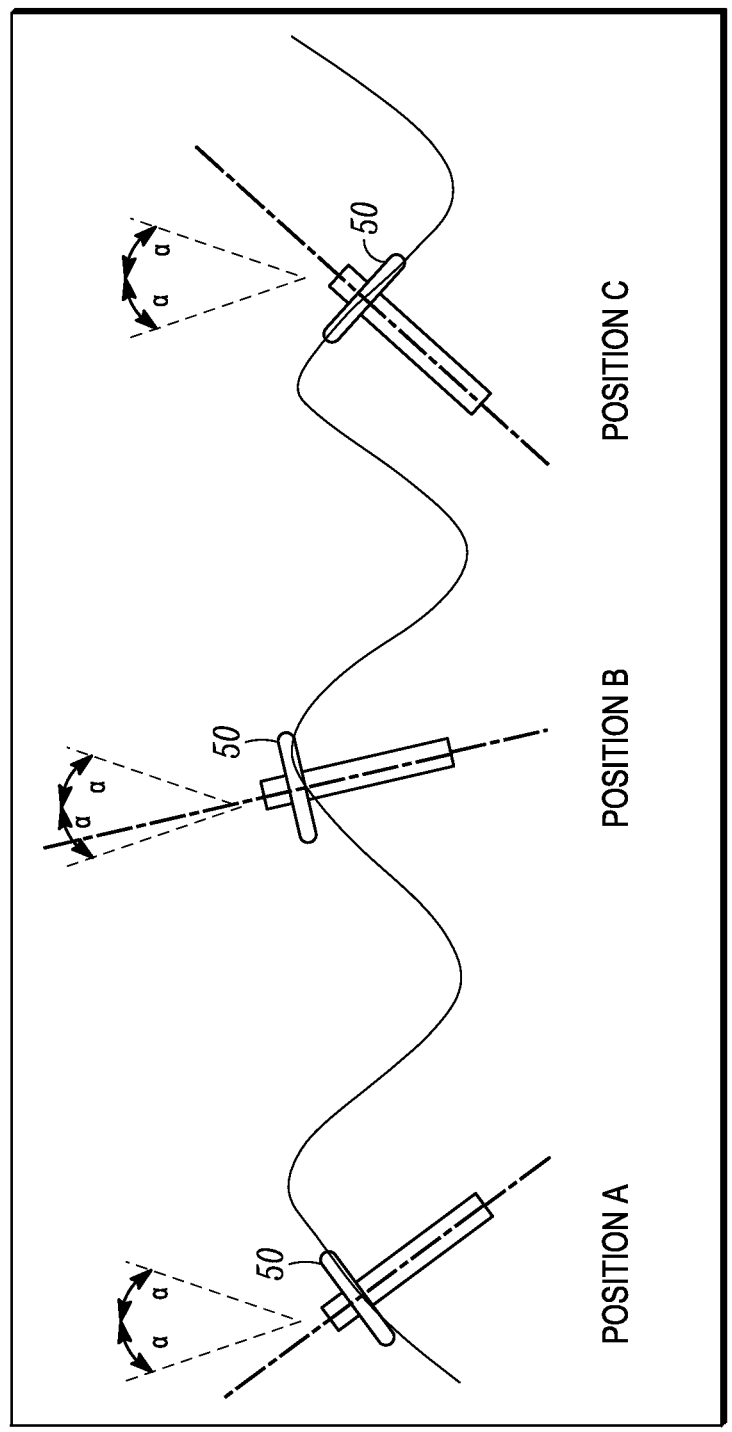
FIG. 8 illustrates operation of a tilt sensor to control launch of the payload.

FIGS. 3 and 4 illustrate the lift bag 50 deployed for a water launch of the UAV, with the lift bag 50 causing the launch system to float at the surface of the water with the upper end of the tube 12 above the surface of the water as illustrated in FIG. 8. It is to be realized that when launching from land or out of water applications, the lift bag 50 and gas cartridges 52 are optional and need not be included.

In water launch embodiments where the system 10 is intended to be re-useable, the lift bag 50 can retain its inflated condition once deployed so that the launch tube 12 remains floating in the water after launching the UAV 30 allowing the tube 12 to be retrieved. In other water launch embodiments, where the system 10 is intended to be disposable, the lift bag 50 can be provided with a scuttle patch that causes the lift bag to deflate, automatically or via actuation, after a period of time so that the launch tube 12 sinks.

With reference to FIGS. 5, 5A and 5B, release of the UAV from the top of the tube 12 will now explained. As seen in FIG. 5A, the releasable cap 16 is provided with one or more seals 54, for example O-rings, that create a fluid-tight seal between the cap 16 and the inner pressure hull 20 and the end of the tube 12. With reference to FIG. 5B, the interior surface of the inner pressure hull 20 is formed with a locking groove 60, for example a circumferentially continuous groove, that receives one or more release tabs 62 provided on the cap 16, for example adjacent the base end thereof. When the cap 16 is installed into the tube 12, the tab(s) 62 snaps into place into the groove 60 locking the cap 16 in the tube 12.

In the ready to launch configuration, there is a gap 64 between the top of the sabot top plate 36 and the base of the cap 16. The perimeter of the sabot top plate 36 includes an upwardly protruding lip 66 with an inner surface 68 that is angled outwardly. When pressurized gas is introduced into the inner pressure hull via the dump valve 28, the compressed gas starts to force the sabot 32 and the UAV 30 upwardly. The sabot push rods 38 force the top plate 36 toward the cap 16. As this occurs, the angled inner surface 68 of the lip 66 engages the tab(s) 62, forcing the tab(s) radially inwardly and removing them from the groove 60. The cap 16 is therefore free to release from the tube 12 as the sabot 32 and the UAV 30 continue to be forced upwardly by the compressed gas.

To prevent inadvertent launch from shocks and other loadings during transport and storage, a lock mechanism 70 can be provided that prevents the sabot top plate 36 from moving toward the cap 16 until the lock mechanism 70 is released. Any lock mechanism 70 that can perform this function can be used. In one non-limiting example, the lock mechanism 70 can comprise a solenoid actuated pin that when activated, extends into the gap 64 to prevent movement of the top plate 36 toward the cap 16. When launch is desired, the lock mechanism 70 is removed to permit the movement and release of the tab(s) 62.

With reference now to FIGS. 6 and 7, another embodiment of a payload launch system 100 is illustrated. Features in common with the system 10 are referenced using the same reference numerals. Unlike the system 10, the launch system 100 includes a sealed, single wall launch tube 102 that is sealed at its bottom end by the service cap 14 and sealed at its top end by the releasable cap 16. The tube 102 can be made from any material, for example steel, aluminum, or plastic, suitable for withstanding launch pressure and the environments within which the launch system 100 is used.

The tube 102 includes an outer pressure hull 108, but no inner pressure hull 20 as in the system 10. Instead, a separate pressure tank 110 is disposed within the tube 102 which can hold the pressurized gas. The tank 110 forms a pressurized gas chamber. Release of the pressurized gas from the tank 110 pressurizes the interior of the tube 102 causing the UAV (or other payload) and sabot to be launched from the tube 102 in a manner similar to that discussed above for the system 10.

The system 100 can also include a communication antenna 112 through which communications can be sent to and from the system 100. For example, launching of the UAV can be triggered upon receipt of a launch signal; deflation of the lift bag 50 can occur upon receipt of a suitable signal; the system 100 can transmit location data, sensory data, status data, and other data to a receiving location; and the like.

FIG. 7 shows a bottom view of the launch tube 102 with the service cap 14 removed. The pressure tank 110 is connected to a manifold 114 which can include the launch dump valve 28 for pressurizing the interior of the tube 102 to launch the UAV, a solenoid valve 116 to direct pressurized gas from the tank 110 to the lift bag for inflating the lift bag 50 (instead of using a separate $CO_2$ canister(s) as in the system 10), a fill valve 118 used for charging the tank 110 with pressurized gas, and a pressure gauge 120.

In another embodiment, an energy source in the form of a compressed, releasable spring is used in place of or to supplement the compressed gas to affect launch. The spring can cause release of the cap 16 and push the sabot and UAV from the launch tube.

The system 100 can also include a communication antenna 112 through which communications can be sent to and from the system 100. For example, launching of the UAV can be triggered upon receipt of a launch signal; deflation of the lift bag 50 can occur upon receipt of a suitable signal; the system 100 can transmit location data, sensory data, status data, and other data to a receiving location; and the like.

Figure 13:
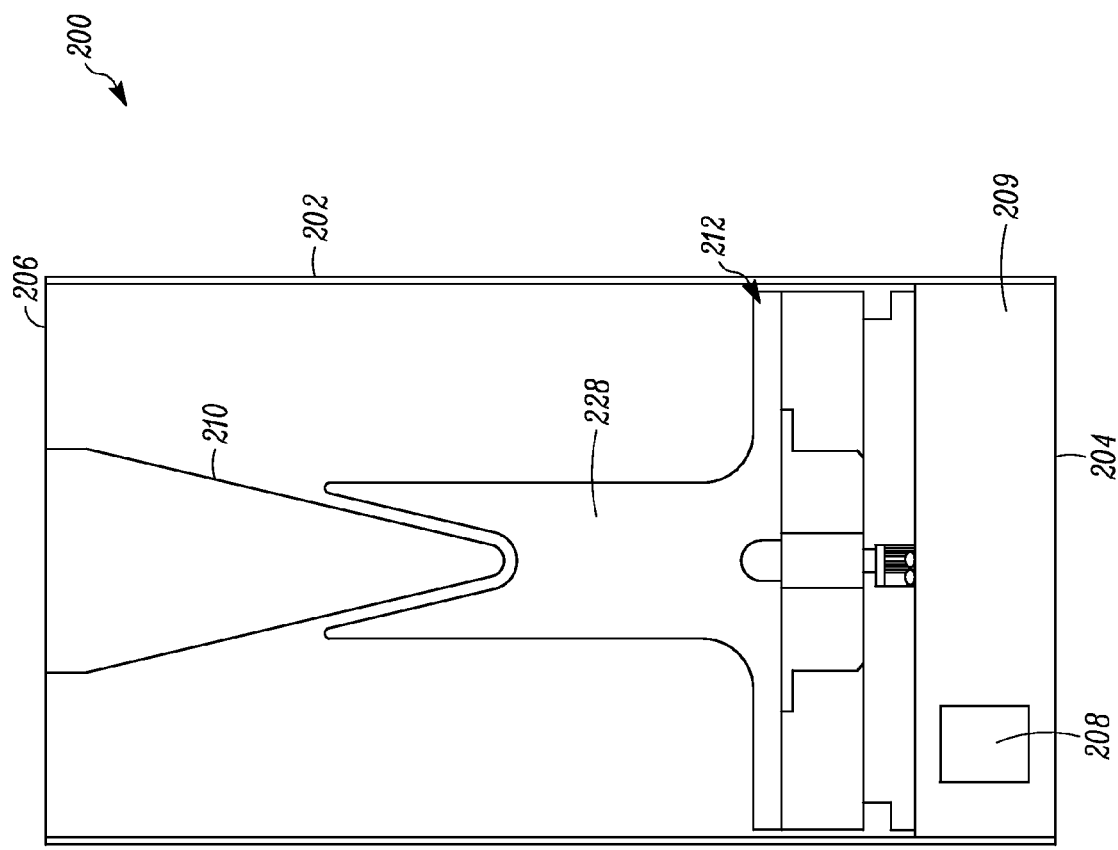
FIG. 13 is a cross-sectional side view of another embodiment of a payload launch system prior to launch, with the upper end of the launch system not shown in detail.

With reference now to FIGS. 13-20, another embodiment of a payload launch system 200 is illustrated. Features in common with the systems 10, 100 are referenced using the same reference numerals. The system 200 includes a sealed, single wall launch tube 202 that is sealed at its bottom end by a service cap 204 and sealed at its top end by a releasable cap 206. In FIG. 13, the top end and the cap 206 of the launch tube 202 are not shown in detail for sake of clarity. Instead, details of the top end and the cap 206 of the launch tube are illustrated in FIGS. 14, 16A-B, and 17.

As best seen in FIG. 13, a separate pressure tank 208 is disposed within a chamber 209 of the system 200 which can hold the pressurized gas. The tank 208 forms a pressurized gas chamber. Alternatively, the chamber 209 can be pressurized so as to form a pressurized gas chamber with the pressurized gas being released therefrom into the launch chamber by a dump valve as described above for FIG. 2. Release of the pressurized gas from the tank 208 and/or the chamber 209 pressurizes the interior of the launch tube 202, which pushes a ram or sabot assembly 212 upward causing an UAV 210 or other payload to be launched from the tube 202 in a manner similar to that discussed above.

Figure 19:
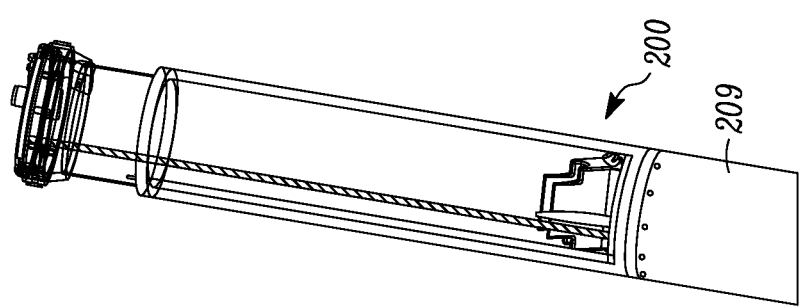
FIG. 19 is a perspective view of a portion of the payload launch system prior to launch.

The ram or sabot assembly 212 is disposed in the launch tube 202 for pushing the AUV 210 or other payload from the tube 202. As shown in FIGS. 13 and 19, in a pre-launch position, the assembly 212 is initially toward the bottom of the tube 202. Upon release of the pressurized gas from the tank 208 or the chamber 209 during launch, the pressurized gas pushes the assembly 212 upward toward the top end to the position shown in FIG. 14, which pushes the AUV 210 out of the tube 202.

Figure 14:
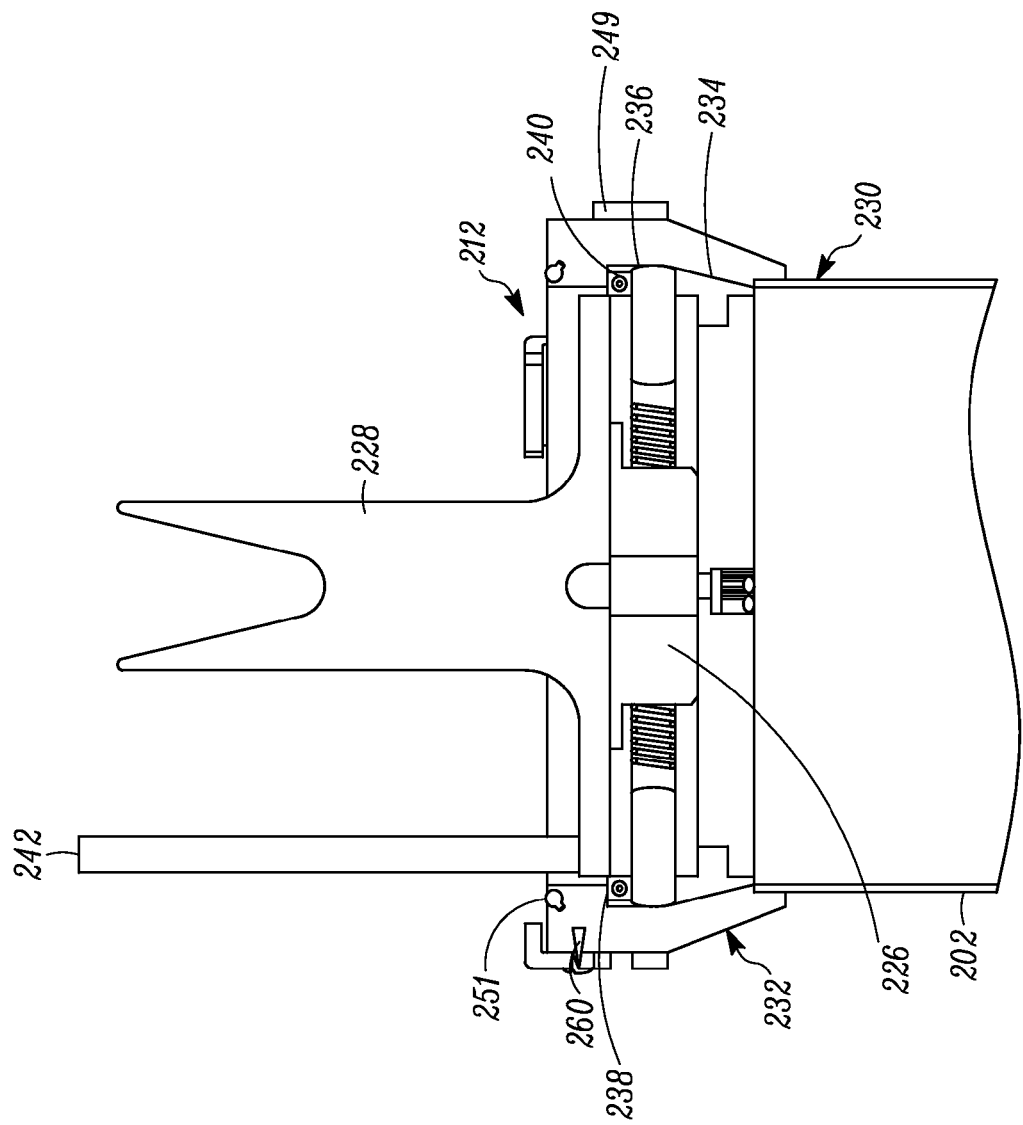
FIG. 14 is a partial cross-sectional side view of the upper end of the payload launch system of FIG. 13 after launch with the lid removed for clarity.
Figure 15:
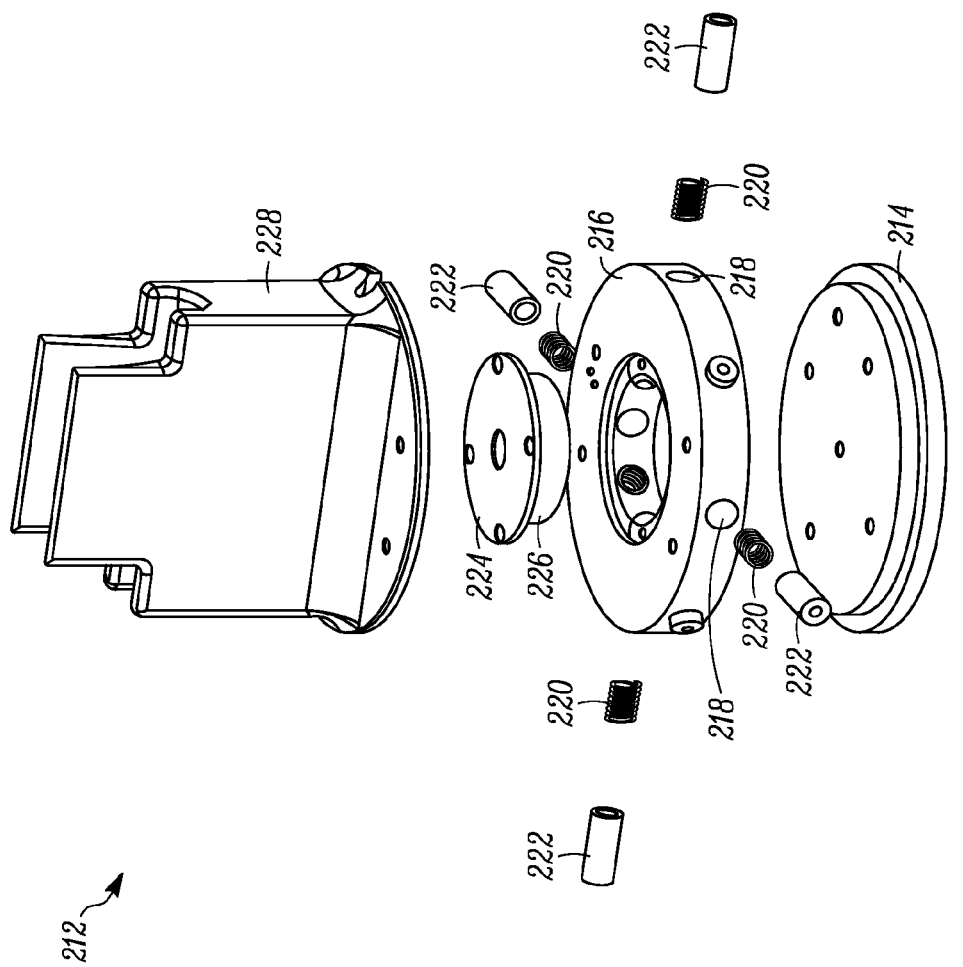
FIG. 15 is an exploded view of a ram or sabot assembly used in the payload launch system of FIGS. 13 and 14.

FIGS. 14 and 15 illustrate details of the assembly 212. The assembly 212 includes a ram 214 that is slidably disposed within the launch tube 202. A stop mechanism 216 is mounted on top of the ram 214. The stop mechanism 216 includes a plurality of holes 218 formed therethrough in which coil springs 220 and stop pins 222 are disposed. The springs 220 bias the stop pins 222 outwardly. A spring stop 224 is mounted on the stop mechanism 216 and has a central boss 226 that is removably disposed in the center of the stop mechanism 216 that closes the inner sides of the holes 218 and against which inner ends of the springs 220 are engaged. A cradle 228 is fixed to the top of the stop mechanism 216. The cradle 228 holds the UAV 210 or other payload in the launch position throughout the time the UAV 210 is in the launch tube 202, for example during storage and operation.

Referring to FIG. 14, an upper end 230 of the launch tube 202 includes a muzzle 232 fixed thereto. An inside wall 234 of the muzzle 232 increases in diameter, compared to a diameter of the launch tube 202, from proximate the upper end 230 to a constant diameter section 236 that has a diameter that is greater than the diameter of the launch tube 202. The inside wall 234 of the muzzle 232 also includes an inwardly projecting shoulder 238 that extends radially inward beyond the wall 234 so that the shoulder 238 defines an opening that has a diameter approximately equal to or less than the diameter of the launch tube 202. In addition, a cushion 240, for example an elastomeric or rubber ring, is disposed on a downwardly facing surface of the shoulder 238.

Figure 18:
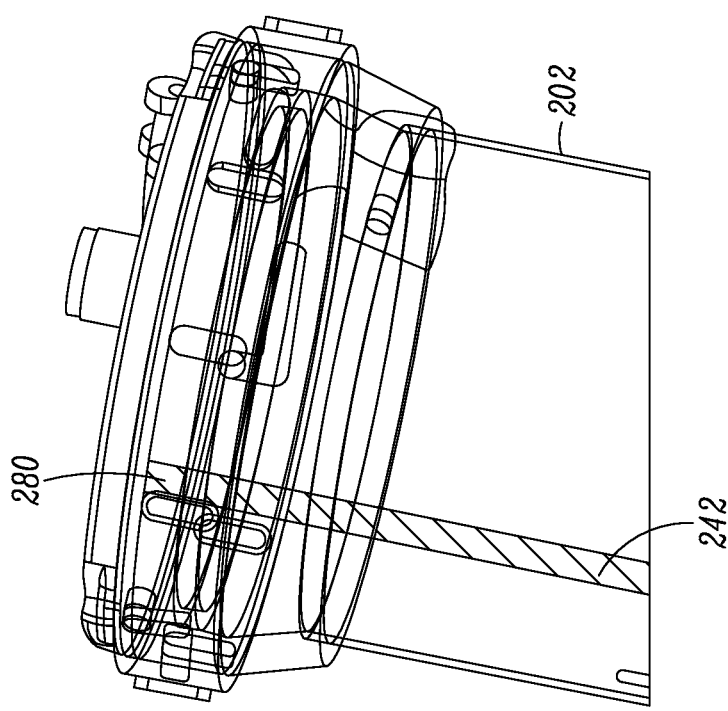
FIG. 18 is a perspective view of the upper end of the payload launch system prior to launch showing relative positions between the lid and an end of a push rod for opening the lid.

In the pre-launch position shown in FIGS. 13 and 18-19, the spring loaded stop pins 222 are held in a retracted position within the holes 218 of the stop mechanism 216 by the inside wall of the launch tube 202. During a launch, the sabot assembly 212 is pushed up the launch tube 202 to the muzzle 232 to the position shown in FIG. 14. The increased inside diameter of the muzzle 232 permits the stop pins 222 to be forced outwardly beyond an outer surface of the stop mechanism 216 by the springs 220. The extended stop pins 220 then contact the cushion 240 which stops the sabot assembly 212 and retains the sabot assembly 212 in the launch tube 202 after the sabot assembly 212 pushes the AUV 210 out of the launch tube 202. The described sabot assembly 212 provides a number of advantages. For example, the sabot assembly 212 remains within the launch tube so there is no loose launch debris. In addition, the sabot also seals the launch tube to prevent entry of water into the launch tube. In addition, the cushion 240 helps to muffle launch noise.

FIGS. 16A and 16B illustrate the upper end 230 of the launch tube 202 prior to launch with the muzzle 232 in place. A manually actuated safety ring 249 is rotatably mounted on an outside surface of the muzzle (also see FIG. 14). The safety ring 249 interacts with a lid 250 as discussed further below to prevent premature opening of the lid 250 and ejection of the payload from the launch tube 202. The lid 250 seals the launch tube 202 prior to launch by engaging with a seal 251 that is disposed at the upper end of the muzzle 232 (see FIGS. 14 and 17), and is opened during launch to permit ejection of the AUV or other payload.

To increase safety, prevent accidental or premature ejection of the AUV or other payload, and prevent accidental opening of the lid 250, the safety ring 249 is designed to be manually rotated from a locked position (shown in FIG. 16A) to an unlocked position (shown in FIG. 16B). With reference to FIGS. 16A and 16B, the safety ring 249 includes one or more, for example three, generally L-shaped slots 252 where a stem 254 of the slot 252 extends somewhat circumferentially and a base 256 of the slot 252 extends generally parallel to the longitudinal axis of the launch tube 202 or generally vertically. The stem 254 extends at an angle upward from its point of connection with the base 256. The safety ring 249 also includes at least one, for example three, radially inwardly extending tabs 258 that project over the opening defined by the muzzle 232.

Figure 17:
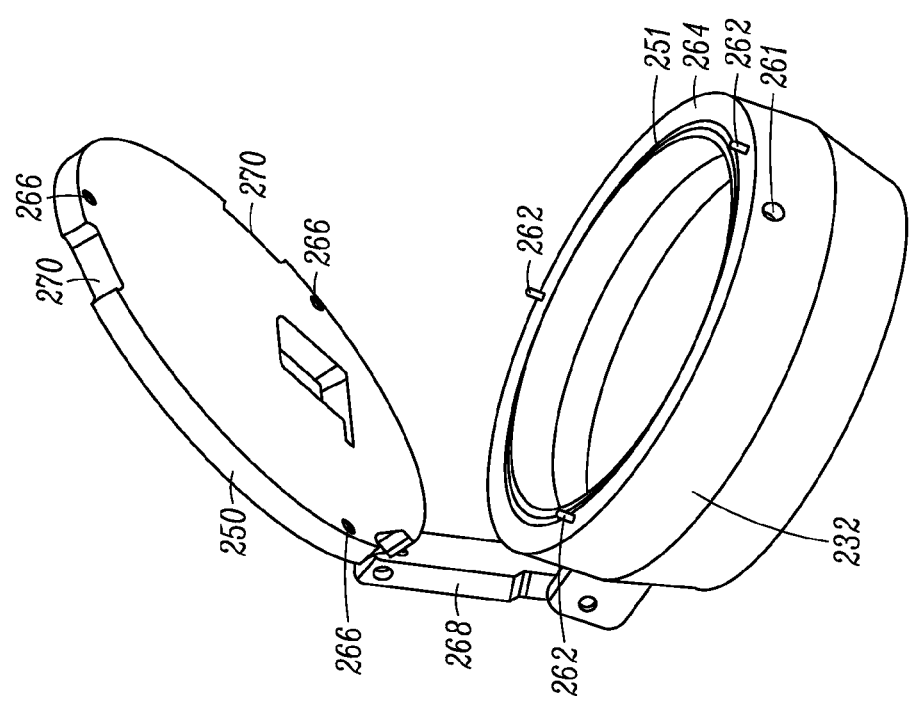
FIG. 17 is a perspective view of the muzzle and lid of the payload launch system of FIGS. 13-16, with the lid in an open position.

With continued reference to FIGS. 16A and 16B along with FIGS. 14 and 17, the muzzle 232 further includes one or more radially outward projecting pins 260 that are disposed in the slots 252 of the safety ring 249. As best seen in FIG. 17, the pins 260 are disposed in and extend from suitable holes 261 formed in the muzzle 232. In addition, the muzzle 232 includes a plurality of pins 262, for example three pins, that extend upwardly from an upper surface 264 of the muzzle 232 radially outward of the seal 251. The pins 262 mate with and are disposed in a corresponding plurality of holes 266 that are formed in an underside of the lid 250 as best seen in FIG. 17. Rubber grommets (not shown) or other friction enhancing elements are disposed in the holes 266 to help frictionally grip the pins 262 when the lid 250 is closed and the pins 262 are disposed in the holes 266. The friction between the pins 262 and the friction enhancing elements in the holes 266 help hold the lid 250 closed prior to launch. During launch, the friction can be overcome to force the lid 250 open so that the payload can launch. Also, as seen in FIG. 17, an optional hinge 268 can be used to secure the lid 250 to the muzzle 232 so that the lid 250 remains attached to the launch tube 202 during launch so that the lid 250 is not discarded and can be re-used.

Referring to FIGS. 16A, 16B and 17, one or more slots 270, corresponding in number to the tabs 258 on the safety ring 249, are formed in the lid 250. When the safety ring 249 is rotated to the locked position shown in FIG. 16A, the slots 270 are offset from the tabs 258 and the tabs 258 overhang the lid 250. In addition, due to the upward angling of the stem 254 of the slot 252 and the pins 260 sliding in the slots 252, rotation of the safety ring 249 to the position shown in FIG. 16A forces the safety ring 249 downward which compresses the lid 250 downward against the seal 251. Due to the resiliency of the seal 251, the seal 251 creates an upward force acting on the lid 250. When the safety ring 249 is rotated to the unlocked position shown in FIG. 16B, the tabs 258 align with the slots 270. In addition, the force from the seal 251 forces the lid 250 upward to a position ready for launch. At this position, the only thing hold the lid 250 in place is the friction force of the pins 262 on the muzzle 232 being held in the holes 266 in the lid 250.

Figure 20:
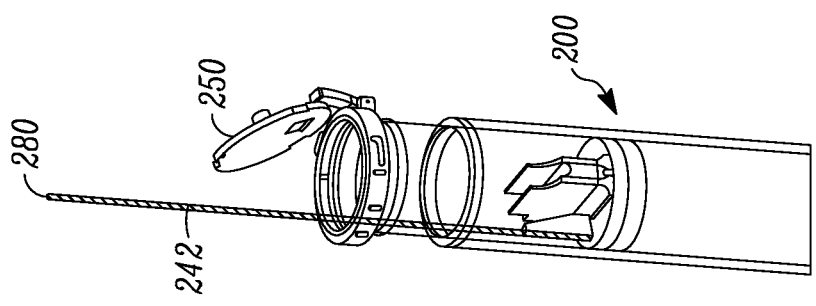
FIG. 20 is a perspective view of a portion of the payload launch system after launch.

As shown in FIG. 14, a push rod 242 can be mounted on the sabot assembly 212. The push rod 242 is used to engage the lid 250 and push the lid 250 open when the sabot assembly 212 is forced upwardly during launch. With reference to FIG. 18, prior to launch, an upper end 280 of the push rod 242 is close to or touching the bottom of the lid 250. During launch, the compressed gas is released from the tank 208 or the compression chamber 209 into the launch tube 202 underneath the sabot assembly 212, which pushes the sabot assembly 212 upward and launching the payload from the launch tube 202. As shown in FIG. 20, as the sabot assembly 212 is forced upward, the end 280 of the push rod 242 forces the lid 250 open by overcoming the friction between the pins 262 and the holes 266.

In an optional embodiment, an antenna 282, for example a GPS antenna, can be provided on the safety lid 250 as shown in FIGS. 16A and 16B. The antenna 282 permits the UAV or other payload within the launch tube 202 to achieve a location fix prior to launch.

Although not illustrated in FIGS. 13-20, the system 200, if used in water, can also utilize the lift bag 50 described with respect to the systems 10, 100. In addition, the individual features described with respect to any one of the systems 10, 100, 200 can be used on any one of the systems 10, 100, 200.

FIG. 8 illustrates one of the launch systems 10, 100, 200 described herein dropped into or otherwise deployed in the water, with the lift bag 50 deployed to cause the launch tube to float at the surface. In one embodiment where the launch system is intended to launch from the water, once launch is initiated, the tilt sensor of the electronics assembly sequences the launch command to a predetermined limited angular window a so the UAV can only be launched within the predetermined angular window. This permits the launch system to be utilized in almost any sea state. The predetermined limits on the angular window a can be programmed by the user or can be communicated to the launch system once deployed in the water.

The angular window a can be any desired window. For example, assuming that the tilt sensor is set to an angular window a equal to about +/−20 Degrees, the launch system will only launch the UAV when transitioning through about +/−20 degrees of the vertical axis. In FIG. 8, at Positions A and C, the launch system is outside of the angular window, and will not launch. However, at Position B, the system is within the +/−20 degree launch window and can therefore initiate a launch.

The launch systems 10, 100, 200 described so far are systems that are transported to the desired launch location by a separate transport means where the launch system is then deployed from the transport means. FIGS. 9-12 illustrate an embodiment intended for a water launch where the launch system 10, 100, 200 can be integrated into an underwater vehicle such as an AUV 150. The AUV 150 can transport the launch system to a desired launch location for launching the payload such as the UAV or other payload. The AUV can transport the UAV or other payload covertly to a location, decreasing the distance between the final launch position and the target. This gives the UAV more time over the target while increasing the distance from the manned platform from where the AUV was launched. In addition, it does not expose the location of the manned platform the AUV was launched from, be it a submarine, surface vessel or aircraft. FIGS. 9-12 illustrate the launch system as being the system 10, but the AUV 150 could be used with the launch systems 100, 200 as well.

Figure 9:
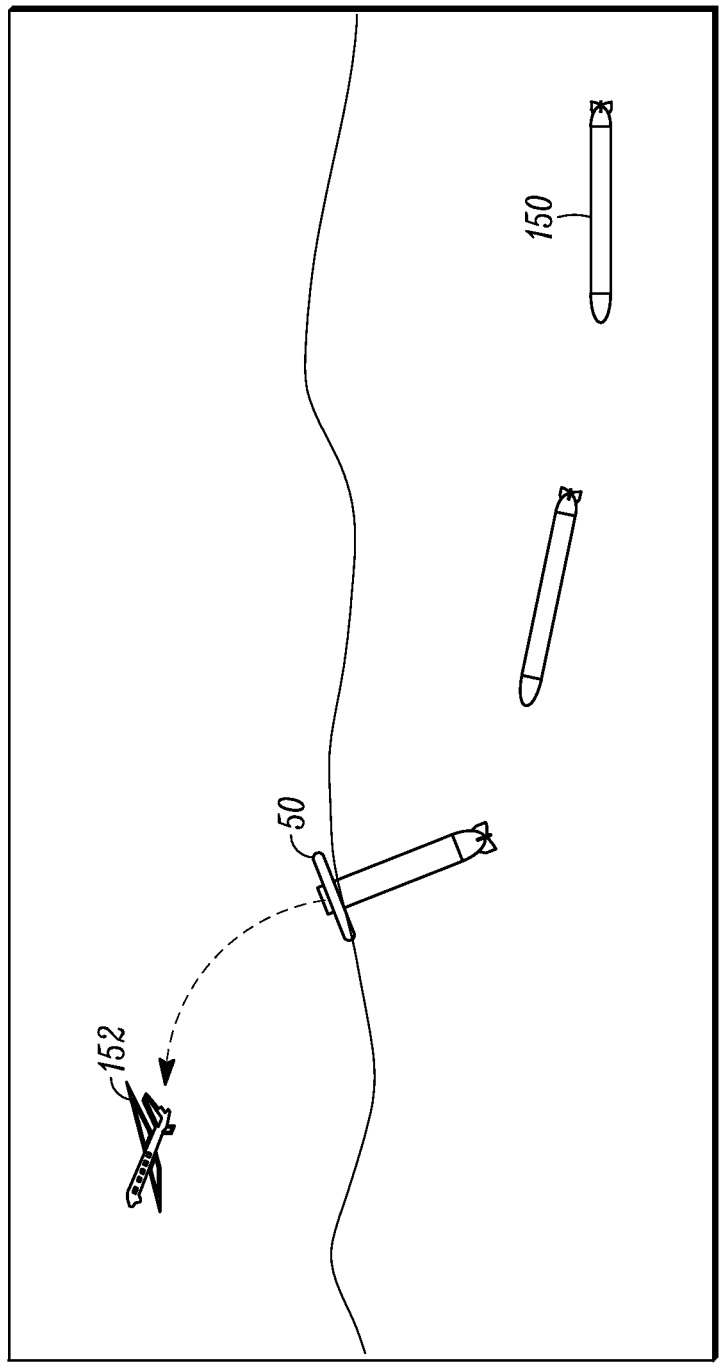
FIG. 9 illustrates a payload launch system described herein incorporated into an AUV.

FIG. 9 illustrates the AUV 150 submerged under the water and propelling itself to a desired launch location at which point the lift bag 50 is deployed so that the launch tube floats at the surface. The payload, such as the UAV, can then be launched. The launch system can communicate with a platform, such as an aircraft 152, prior to or after launch, or the launch system can sense the surrounding environment prior to or after launch.

With reference to FIGS. 10-12, the launch system portion of the AUV 150 is similar to the previously described launch system 10 (or launch systems 100, 200) and similar elements are described using the same reference numerals.

The AUV 150 includes a rear section 160 containing one or more batteries, controls, and a propulsion mechanism 162 for propelling the AUV from one location to another. The propulsion mechanism 162 can be any propulsion mechanism capable of propelling the AUV 150, such as a propeller driven by a motor 164 that is powered by one or more the batteries 166 best seen in FIG. 12. The rear section 160 can also include a steering mechanism, separate from or integral with the propulsion mechanism, such as steerable fins or the propeller can be steerable. In this embodiment, the batteries 40 and a controller assembly 42 described above in the system 10 can be replaced by the controls and the batteries in the rear section 160 of the AUV.

Once the payload is launched, the AUV 150 can be retrieved for re-use, or the AUV 150 can be disposable by deflating the lift bag 50 so that the AUV 150 sinks to the bottom.

Rather than integrating the payload launch system into an AUV, in another embodiment the payload launch system 10, 100, 200 can be towed underwater by a manned or unmanned underwater vehicle, for example an AUV. The payload launch system 10, 100, 200 can be positioned on the vehicle at any location that permits release of the payload launch system for subsequent launching of the payload or permits launch of the payload while directly attached to the vehicle. Example positions include on top of the vehicle, below the vehicle, or stowed in or within the vehicle. The payload launch system 10, 100, 200 can also be towed behind the vehicle using a tether. The payload launch system could also be stowed in the water on any underwater fixed platform.

The launch systems 10, 100, 200 provide the following unique features among others:
  A fully sealed UAV or other payload launch tube designed for harsh remote environments on land, above or below the surface of the water, i.e.; land, water surface and sub-surface deployed;
  A multi-application launch system for fixed, moving land and waterborne platforms;
  Propulsion is a readily available compressed gas;
  The sealed cap has an "auto-release" mechanism to manually unlock the cap, break the seal and freely launch the UAV or other payload;
  The sabot auto-release cap mechanism has a "shock-lock" device that may be needed when firing the launch system from platforms utilizing a type of launch cannon that would induce a shock that might cause the auto-release cap to prematurely activate. The shock-lock device blocks the movement between the sabot and the auto-release cap, inhibiting the auto-release mechanism's movement;

For underwater applications, once launch is initiated an angular tilt sensor can sequence the fire command to a predetermined limited angular window so the system can be utilized in almost any sea state;

An antenna can be mounted to the launch tube;

The launch system can be expendable or reused;

The launch system can be launched from an underwater platform;

The launch system can be used on fixed or moving platforms;

The launch system can be used with folding UAV's with extendable airfoils.

The AUV 150 provides the following unique features among others:

An AUV that launches a UAV or other payload;

An AUV with a payload comprising a UAV;

A UAV that is transported and protected inside an AUV;

An unmanned method to transport and launch a UAV covertly from the water;

An unmanned method to launch a UAV from an underwater platform in shallow waters;

An unmanned underwater aircraft carrier.

Exemplary Launch Sequence

The following is an exemplary launch sequence of the launch system 10 assuming the payload is the UAV 30. This sequence is an example only and other sequences can be utilized. In addition, a somewhat similar sequence can be used for the launch systems 100, 200.

Pre-Flight Setup:

The folded UAV 30 is fitted to the sabot 34, 36, 38.

The sabot and UAV are loaded into the launch tube 12.

The auto-release sealed cap 16 is snapped into place sealing the launch tube.

The gas chamber 22 is charged with compressed gas.

The system 10 is ready for launch.

Standard Launch Sequence:

The pre-launch and launch switches are activated, for example from a human at the end of a wire, remotely via RF or acoustic signals depending upon the application, or automatically at the end of a predetermined time period.

The pre-launch switch warms up the UAV and gets a GPS fix via the external antenna 112 mounted directly to the launch tube or mounted somewhere else. The "shock lock" mechanism 70 is unlatched readying the auto-release cap 16 for launch. Power is provided from the on-board battery 40 or external battery depending on the application.

The launch switch energizes the dump valve 28 with power provided from the on-board battery or external battery depending on the application.

The dump valve 28 releases the compressed gas from the stored gas chamber 22 into the inner pressure hull 20.

The sabot begins to move up the launch tube. The top plate 36 of the sabot unlocks the tabs 62 on the auto-release cap, and everything continues to exit the tube.

Once out of the tube, the sabot falls away as the UAV extends its wings and takes flight.

Underwater Launch Sequence:

The launch tube is designed for harsh underwater environments and can withstand external water pressure to a certain water depth.

The same pre-flight setup is used as above.

The launch tube is released into the water, with natural buoyancy or if additional buoyancy is needed the lift bag 50 can be inflated, so that the launch tube floats at the surface.

The launch tube will protrude above the water surface.

Once launch is initiated, the tilt sensor sequences the fire command to a limited angular window so the system can be utilized in almost any sea state.

During launch, the lift bag 50 or wave damping collar will resist the launch tubes downward sinking reaction from the launch forces.

During operation if the antenna 112 is attached to the launch tube, the launch tube can remain on the surface to communicate with the UAV.

After operation, an operator has the option to scuttle the launch tube by activating the scuttle mechanism(s) on the lift bag 50 or retrieve the system and re-use it.

The examples disclosed in this application are to be considered in all respects as illustrative and not limitative. The scope of the invention is indicated by the appended claims rather than by the foregoing description; and all changes which come within the meaning and range of equivalency of the claims are intended to be embraced therein.

The invention claimed is:

1. A payload launch system, comprising:
a launch tube defining a launch chamber, a cap releasably secured to the launch tube and closing an open end of the launch chamber;
a payload and sabot disposed within the launch chamber, the payload is connected to the sabot;
a stowed, deployable lift hag in the launch tube; and
an energy source in the launch tube that can be selectively applied to the payload and sabot to launch the payload from the launch chamber.

2. The payload launch system of claim 1, wherein the energy source comprises a source of compressed gas.

3. The payload launch system of claim 2, wherein the source of compressed gas comprises a compressed gas storage chamber fluidly separated from the launch chamber by a valve that is positioned to selectively place the compressed gas storage chamber in fluid communication with the launch chamber.

4. The payload launch system of claim 1, wherein the payload is an unmanned aerial vehicle.

5. The payload launch system of claim 1, further comprising a controller electronics assembly in the launch tube, the controller electronics assembly includes a tilt sensor.

6. A payload launch system, comprising:
a launch tube defining a launch chamber, a cap releasably secured to the launch tube and closing an open end of the launch chamber;
a payload and sabot disposed within the launch chamber, the payload is connected to the sabot;
an energy source in the launch tube that can be selectively applied to the payload and sabot to launch the payload from the launch chamber; and
a propulsion mechanism connected to the launch tube that propels the launch tube.

7. The payload launch system of claim 6, wherein the prolusion mechanism comprises a propeller; and further comprising a motor connected to the propeller, and one or more the batteries providing power to the motor.

8. The payload launch system of claim 1, further comprising a stop mechanism in the launch tube that prevents the sabot from being ejected from the launch tube.

9. The payload launch system of claim 8, further comprising a cushion in the launch tube that is engageable by the stop mechanism.

10. A payload launch system, comprising:
a launch tube defining a launch chamber, a cap releasably secured to the launch tube and closing an open end of the launch chamber;
a payload and sabot disposed within the launch chamber, the payload is connected to the sabot;
an energy source in the launch tube that can be selectively applied to the payload and sabot to launch the payload from the launch chamber; and
the cap is sealed with the launch tube to prevent ingress of water into the launch tube, and further comprising a manually actuated, releasable safety device that is manually rotatable relative to the launch tube between a locked position and an unlocked position to control release of the cap.

11. An autonomous underwater vehicle, comprising:
the payload launch system of claim 1; and
a propulsion mechanism connected to the payload launch system.

\* \* \* \* \*